United States Patent
Bourse et al.

(10) Patent No.: US 11,632,072 B2
(45) Date of Patent: Apr. 18, 2023

(54) METHOD FOR CONTROLLING AN INVERTER

(71) Applicant: Safran Electrical & Power, Blagnac (FR)

(72) Inventors: Wenceslas Bourse, Blagnac (FR); Pascal Jacques Frédéric Guy Toutain, Blagnac (FR); David Baltaro, Blagnac (FR)

(73) Assignee: Safran Electrical & Power, Blagnac (FR)

( * ) Notice: Subject to any disclaimer, the term of this patent is extended or adjusted under 35 U.S.C. 154(b) by 0 days.

(21) Appl. No.: 16/981,054

(22) PCT Filed: Mar. 15, 2019

(86) PCT No.: PCT/FR2019/050579
§ 371 (c)(1),
(2) Date: Sep. 15, 2020

(87) PCT Pub. No.: WO2019/186020
PCT Pub. Date: Oct. 3, 2019

(65) Prior Publication Data
US 2021/0006191 A1     Jan. 7, 2021

(30) Foreign Application Priority Data

Mar. 16, 2018  (FR) ..................... 1852290

(51) Int. Cl.
*H01L 29/778*     (2006.01)
*H02P 27/08*      (2006.01)
*H02P 27/04*      (2016.01)

(52) U.S. Cl.
CPC .......... *H02P 27/085* (2013.01); *H02P 27/045* (2013.01)

(58) Field of Classification Search
CPC ...... H02P 27/085; H02P 27/045; B64C 11/44; B64C 2027/7283; B60L 15/08; H01L 29/7787
See application file for complete search history.

(56) References Cited

U.S. PATENT DOCUMENTS 5,541,488 A * 7/1996 Bansal ................. G01P 3/48
                                              318/801
2010/0127652 A1 * 5/2010 Morita ............. H01L 29/7787
                                              318/400.27

(Continued)

FOREIGN PATENT DOCUMENTS

EP      2 605 400 A1   6/2013

OTHER PUBLICATIONS

International Search Report dated Sep. 13, 2019 in International Application No. PCT/FR2019/050579.

(Continued)

*Primary Examiner* — Cortez M Cook
(74) *Attorney, Agent, or Firm* — Sughrue Mion, PLLC

(57) ABSTRACT

The invention relates to a method for controlling a three-phase inverter (3) using a 120° control arrangement associated with a PWM-type control, the inverter (3) being driven by a controller and configured to power a permanent-magnet synchronous motor (5) of a device on board an aircraft. The motor (5) comprises a stator and a rotor that can be rotated relative to the stator when the motor (5) is powered. The inverter (3) comprises three branches (31, 32, 33), each branch comprising two switches (310, 311, 320, 321 and 330, 331) associated with a motor winding sing a 120° control arrangement of a three-phase inverter. The method is characterised in that when one switch on one branch is controlled such as to switch front the on-state to the off-state, the other switch on said branch is controlled such as to be in (Continued)

the on-state for a sufficient amount of time to allow the magnetic discharge of the motor winding associated with said branch.

14 Claims, 4 Drawing Sheets

(56) References Cited

U.S. PATENT DOCUMENTS

2011/0012544 A1* 1/2011 Schulz .................... B60L 15/08
318/400.33
2014/0300303 A1* 10/2014 Said ........................ H02H 3/16
318/400.21

OTHER PUBLICATIONS

Search Report dated Dec. 10, 2018 in French Application No. 1852290.

* cited by examiner

METHOD FOR CONTROLLING AN INVERTER

CROSS REFERENCE TO RELATED APPLICATIONS

This application is a National Stage of International Application No. PCT/FR2019/050579 filed Mar. 15, 2019, claiming priority based on French Patent Application No. 1852290 filed Mar. 16, 2018, the entire disclosures of each of which are herein incorporated by reference in their entireties.

FIELD OF THE INVENTION

The invention relates to a control method of an inverter comprising a plurality of switches capable of being controlled in the passing/blocking state for regulation of the electrical power supply of a motor.

This method is in particular intended to be implemented to control the electrical power supply of a motor of a device carried on board an aircraft, such as for example a fan, a compressor or a pump.

The invention also relates to a controller of an inverter configured to implement a method of this type and an electrical power supply system for a motor which comprises a controller of this type and an inverter of this type.

PRESENTATION OF THE PRIOR ART

Aircraft, and in particular commercial airplanes, comprise a large quantity of electrical devices intended to assist in piloting and for the comfort of the passengers. These devices include in particular fans intended for avionic cooling and ventilation systems, compressors or pumps. The aircraft comprises an electrical network for voltage supply to these devices. The electrical voltage is supplied to the network by means of voltage generators installed in the engines (propeller or jet) of the aircraft. The electrical voltage transported by the network is generally an alternating voltage, rectifiers allowing the conversion of this alternating voltage into direct voltage in order to supply devices requiring a direct supply voltage of this type.

Electrical devices intended for assisting in piloting and for the comfort of passengers, such as fans for example, thus most often comprise an input rectifier to obtain a direct input voltage, the rectifier being followed by an inverter controlled by a control module to regulate the alternating voltage supply to the motor of the device, so as to be able to control for example the speed of rotation of the blades of the fan.

An inverter of this type includes a plurality of switches, in which each switch is designed, for example, to be in a passing state when a control signal applied to it assumes the logical value "1," and to be in a blocking state when a control signal applied to it assumes the logical value "0." The states (passing or blocking) of the set of switches for a given angular sector of the motor are controlled according to control laws. The set of control laws defines a table of inverter controls.

An inverter generates losses primarily linked to the conduction of current through the power components (MOS transistors and power diode) and to the switching of the current in the power components.

These losses reduce the efficiency of the control of the motor and thereby degrade the reliability of the inverter.

This is particularly the case when it is necessary to protect the inverter from shocks or from an austere environment using a protective coating, such as a resin coating for example, which slows thermal dissipation.

The 120° control arrangement of a three-phase inverter allows reducing the losses in the power components, because it allows reducing the number of transistor in conduction and switching at a given instant.

Moreover, this control requires few material and software resources.

To be able to regulate the speed of the motor, it is necessary to control the value of the current in the motor phases.

It is possible to accomplish this via an inverter control of the PWM ("Pulse Width Modulation") type.

Control laws have been developed specifically to optimize the electrical and thermal efficiency of a motor controlled by a 120° controlled inverter associated with a PWM type control, such as for example control of the "synchronous rectification" type.

This control is known from the prior art and is widespread, particularly in DC/DC type converters (for example in "BUCK" converters or choppers).

One difficulty is to improve the efficiency of the inverter while retaining the simplicity of the 120° control of the motor control, and in particular to propose an efficiency improvement of this type which is compatible with control of the "synchronous rectification" type.

PRESENTATION OF THE INVENTION

One general object of the invention is to mitigate the disadvantages of the regulation systems of the prior art.

In particular, one object of the invention is to propose a solution for improving the efficiency of the inverter while retaining the simplicity of the 120° control of the motor control.

The object is attained within the scope of the present invention thanks to a method for controlling a three-phase inverter using a 120° control arrangement associated with a PWM type control, the inverter being controlled by a controller and configured to power a permanent magnet synchronous motor of a device carried on board an aircraft, said motor comprising a stator and a rotor designed to be driven in rotation relative to the stator when the motor is powered, the inverter comprising three branches, each including two switches associated with a motor winding using a 120° control arrangement of a three-phase inverter, characterized in that, when one switch of a branch is controlled from the passing state to the blocking state, the other switch of said branch is controlled so as to be in the passing state for a sufficient time for the magnetic discharge of the motor winding associated with said branch.

The on-board device can for example be a fan, a compressor or a pump.

Said method thus allows easily implementing a new control law which allows reducing losses by conduction by forcing the current to pass through a switch rather than a power diode during a so-called demagnetization period.

This loss reduction can be implemented for control of the PWM type with or without "synchronous rectification" control.

Advantageously, but optionally, the method according to the invention can also comprise at least one of the following features:

throughout the magnetic discharge time interval of a motor winding associated with a branch, the signal that controls the switch which receives the PWM signal is replaced by a signal designed to retain said switch in a passing state.

the PWM type control includes active synchronous rectification.

throughout the magnetic discharge time interval of a motor winding associated with a branch, the signal that controls the switch which receives the $\overline{\text{PWM}}$ signal is replaced by a signal designed to retain said switch in a blocking state.

Determination of the speed of the rotor relative to the stator and calculation by the controller of the duration of the magnetic discharge time interval of a motor winding associated with a branch according to an affine relation of the determined value of the speed of the rotor relative to the stator, said affine relation being previously determined and stored in memory in the controller.

the affine relation is predetermined by the implementation of the following steps:
  Estimation of the electrical impedances of the motor for different determined values of the speed of the rotor relative to the stator;
  Numerical solution of the electrical equations governing the motor for different determined values of the speed of the rotor relative to the stator;
  Estimation of the duration of the magnetic discharge time interval of a motor winding for different determined values of the speed of the rotor relative to the stator;
  Determination of an affine relation of the estimated duration of the magnetic discharge time interval of a motor winding as a function of the determined value of the speed of the rotor relative to the stator;
  Storage in memory of the parameters of the affine relation in the controller.

The invention also has as its object a controller of a three-phase inverter using a 120° control arrangement associated with a PWM type control, configured to power a permanent magnet synchronous motor of a device carried on board an aircraft, said motor comprising a stator and a rotor designed to be driven in rotation relative to the stator when the motor is powered, the inverter comprising three branches, each including two switches associated with a motor winding using a 120° control arrangement of a three-phase inverter, said controller being designed to:
  generate a first digital signal having two voltage levels capable of controlling the switching from the passing state to the blocking state of a first switch of a branch.
  generate a second digital signal having a voltage level capable of controlling the passing state of the second switch of said branch for a sufficient time for the magnetic discharge of the motor winding associated with said branch, when the first switch is controlled so as to switch from the passing state into the blocking state.

Advantageously, but optionally, the controller according to the invention can also comprise at least one of the following features:
  it is designed to replace a digital PWM signal received by the switch throughout the magnetic discharge time interval of a motor winding associated with a branch, with a signal designed to retain said switch in a passing state throughout said interval.
  the 120° control arrangement is associated with a PWM type control with active synchronous rectification.

it is designed to replace a digital $\overline{\text{PWM}}$ signal received by the switch throughout the magnetic discharge time interval of a motor winding associated with a branch, with a signal designed to retain said switch in a blocking state throughout the interval.

it comprises an input of a communication line to a sensor designed to measure a position or a speed of the rotor relative to the stator of the motor, a medium designed to retain in memory a determined value of a speed and a predetermined affine relation of the duration of the magnetic discharge time interval of a motor winding associated with a branch as a function of the determined value of the speed of the motor; and means for calculating, as a function of the determined value of the speed of the motor, a duration of the magnetic discharge time interval of a motor winding associated with a branch.

The invention also has as its object an electrical power supply system of a motor, the motor comprising a stator and a motor mounted in rotation relative to the stator, the power supply system comprising:
  an inverter comprising a plurality of switches controlled for the regulation of the electrical power supply of the motor,
  a controller of the inverter, and
  a sensor designed to measure a position or a speed of the rotor relative to the stator,
said controller being a controller as described above in this section.

The method, the controller and the system proposed therefore allow easily implementing a new control law which allows reducing losses by conduction by forcing the current to pass through a switch rather than a power diode during a so-called demagnetization period.

PRESENTATION OF THE FIGURES

Other features and advantages of the invention will be revealed by the description that follows, which is purely illustrative and not limiting, and must be read with reference to the appended drawings in which.

DETAILED DESCRIPTION

Figure 1:
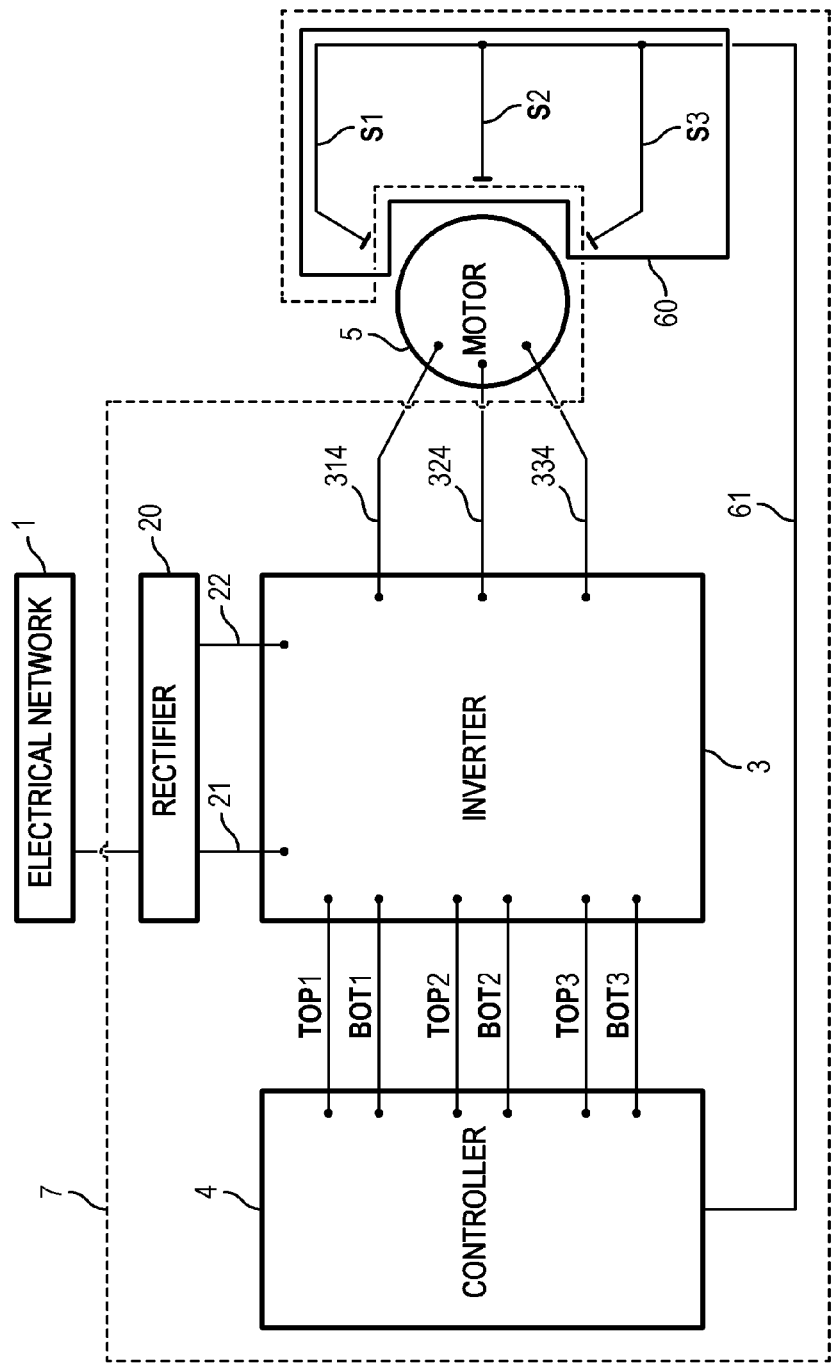
FIG. 1 shows schematically an electrical power supply system of a motor according to one embodiment of the invention.

With reference to FIG. 1, an electrical device intended for assisting piloting and for the comfort of the passengers (not shown), such as a fan, a compressor or a pump for example, comprises an electric motor 5 and an electrical power supply system 7 of the motor 5.

In known fashion, the motor 5 comprises a stator (not shown) and a rotor (not shown) mounted in rotation relative to the stator. The rotor carries permanent magnets, or a winding.

Windings, (not shown), carried by the stator, are designed to generate a magnetic field, under the influence of which the rotor is driven in rotation relative to the stator.

The rotor is substantially cylindrical and the stator extends substantially coaxially around or inside the rotor.

The rotor is designed to rotate around its axis.

An angle is defined between the stator and the rotor relative to a reference position of the rotor relative to the stator.

The power supply system 7 comprises a rectifier 20, an inverter 3 capable of supplying electrical power to the motor 5, a controller 4 for controlling the inverter 3, and a sensor 60 to measure the angle of the rotor of the motor 5 relative to the stator, and optionally the speed of the rotor of the motor 5 relative to the stator.

The sensor 60 is typically a Hall effect sensor designed to determine the angle of the rotor as a function of the orientation of the magnetic field seen by the sensor 60.

In particular, the motor 5 is divided into angular sectors (not shown), and the sensor 60 is designed to identify in which angular sector the angle formed between the rotor and the stator is located.

For example, the number of angular sectors is equal to six and the sensor 60 comprises three Hall-effect probes, denoted S1, S2, S3 in FIG. 1.

The sensor 60 is connected electrically to the controller 4 by a line which carries the electrical signal 61.

The controller 4 and the inverter 3 are connected by six electrical lines which carry the signals TOP1, BOT1, TOP2, BOT2, TOP3 and BOT3.

The rectifier 20 is interleaved between an electrical network 1, typically an aircraft electrical network, and the inverter 3.

The latter is designed to convert the voltage conveyed by the electrical network 1 into a substantially direct voltage supplying power to the inverter 3.

The rectifier 20 is connected electrically to the inverter 3 via a positive line 21, with a substantially constant positive potential, and via a negative line 22, with a substantially constant negative potential.

The inverter and the motor are connected by three electrical lines 314, 324 and 334.

Figure 2:
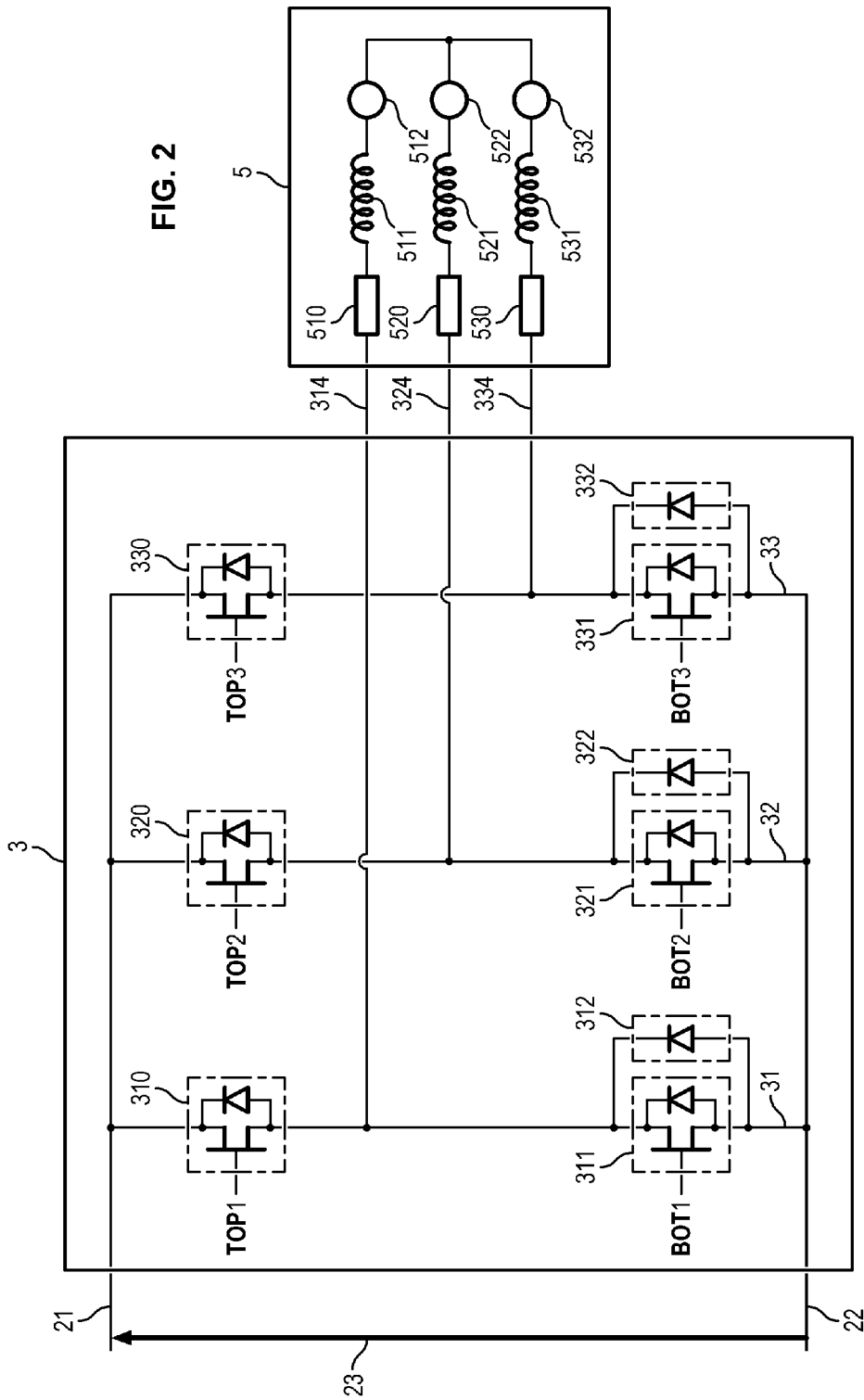
FIG. 2 shows the electrical circuits of the inverter according to one embodiment of the invention.

Referring to FIG. 2, the inverter 3, supplied with a substantially direct voltage 23 between the positive line 21 and the negative line 22, comprises three switching branches 31, 32, 33 mounted in parallel.

Each branch, respectively 31, 32, 33, includes two controlled switches, respectively 310, 311, 320, 321, 330, 331, mounted in series and between which is connected an output line, respectively 314, 324, 334, for supplying power to the motor 5.

In particular, the output lines 314, 324, 334 are designed to supply the windings of the stator with electrical current.

In the exemplary embodiment of FIG. 2, each output line 314, 324, 334 corresponds to an input of the three-phase power supply of the motor 5.

For each branch, respectively 31, 32, 33, a first switch, respectively 310, 320, 330, is positioned between the positive line 21 and the associated output line, respectively 314, 324, 334, and a second switch, respectively 311, 321, 331, is positioned between the negative line 22 and the associated output line, respectively 314, 324, 334.

Each switch 310, 311, 320, 321, 330, 331 is able to switch between a passing state, in which it connects electrically the positive 21 or negative 22 line and the associated output line 314, 324, 334, and a blocking state, in which it electrically isolates said lines.

Each switch 310, 311, 320, 321, 330, 331 preferably includes a MOSFET transistor and its intrinsic diode.

Optionally, a second power diode is associated with each switch 310, 311, 320, 321, 330, 331 in anti-parallel orientation.

The output lines 314, 324, 334, are connected to three windings of the stator of the motor 5.

Each winding has been schematized electrically by an electrical resistance (510, 520 and 530) which corresponds to the losses by Joule effect in the winding, a non-resistive coil (511, 521 and 531) which corresponds to the inductive effects of the winding and a generator (512, 522 and 532) of electromotive force.

The electromotive force is proportional to the speed of the rotor.

The controller 4 is designed to generate six cyclic digital signals TOP1, BOT1, TOP2, BOT2, TOP3 and BOT3 for controlling the switches, respectively 310, 311, 320, 321, 330, 331 as a function of the angle measured relative to the stator and as a function of the speed calculated by the controller 4 via the measurements originating in the sensor 60.

The speed of the rotor relative to the stator can also be measured by a suitable sensor and sent to the controller 4.

What is meant by "cyclic digital signal" is a signal designed exclusively to assume two voltage values V+ and Vo, the first voltage value V+ corresponding to a logical "1" and the second voltage value V0 corresponding to a logical "0", the first value being greater than the second value.

The cyclic digital signal alternating between the first voltage level V+ and the second voltage level V0 is able to successively control the closing and the opening of a switch.

Table 1 is an example of the table of control laws of a 120° inverter associated with a PWM type control according to the prior art.

TABLE 1 example of control law table of a 120° inverter associated with a PWM type control

| S3 | S2 | S1 | SECT | TOP1 | TOP2 | TOP3 | BOT1 | BOT2 | BOT3 |
|---|---|---|---|---|---|---|---|---|---|
| '0' | '0' | '1' | 1 | '0' | PWM | '0' | '1' | '0' | '0' |
| '1' | '0' | '1' | 5 | '0' | '0' | PWM | '1' | '0' | '0' |
| '1' | '0' | '0' | 4 | '0' | '0' | PWM | '0' | '1' | '0' |
| '1' | '1' | '0' | 6 | PWM | '0' | '0' | '0' | '1' | '0' |
| '0' | '1' | '0' | 2 | PWM | '0' | '0' | '0' | '0' | '1' |
| '0' | '1' | '1' | 3 | '0' | PWM | '0' | '0' | '0' | '1' |

Columns "S1," "S2," "S3" correspond to measurements of the sensor 60 which allow determining in which angular sector the angle formed between the rotor and the stator is located.

The "SECT" column corresponds to the identification of the sector as a function of the measurements of the sensor 60.

The example proposed here corresponds to a number of 6 sectors numbered from 1 to 6.

The columns "TOP1," "TOP2," "TOP3," "BOT1," "BOT2 and "BOT3" correspond to cyclic digital signals generated by the controller and transmitted to the switches of the inverter, respectively 310, 320, 330, 311, 321 and 331.

A "0" signal corresponds to a blocking state of the switch, a "1" signal corresponds to a passing state of the switch, and a "PWM" signal corresponds to a modulation of the pulse width, i.e. to a signal which assumes successively the values "0" and "1" and causes the switch to switch alternately from a blocking or passing state to the other.

The "PWM" signal allows regulating the speed of the motor, for example by controlling the ratio between the duration during which said signal assumes the value "0," relative to the duration during which said signal assumes the value "1."

Depending on the measurements originating in the sensor 60, the angular sector in which the rotor is located is determined.

Based on this information, the controller 4 generates the six corresponding signals in the control law table.

The six signals are transmitted to the six switches, so that electrical power supply to the stator is accomplished.

The magnetic field generated by the stator is designed to apply a force to the rotor which allows the continuation of its rotary motion relative to the stator.

Then the orientation of the rotor enters into the following sector, the measurements originating in the sensor 60 are modified and the different steps above are again implemented.

For each line of the table, only two signals are not held at "0" during the entire duration when the rotor is in the corresponding sector.

A first switch among the switches 310, 320, 330 receives the "PWM" signal, and a second switch among the switches 311, 321, 331 of a different branch from the first signal receives the signal "1."

The branch among the branches 31, 32 and 33 is denoted A corresponding to the first switch and B, the branch associated with the second switch.

For each line of the table a current called the motor current passes through the motor winding associated with branch A while generating a positive electromotive force.

This motor current then passes through the motor winding associated with branch B while generating a negative electromotive force.

Finally, the motor current passes through the second switch of branch B which receives the signal "1."

Depending on the value of the "PWM" signal, the motor current does not pass through the same elements of branch A.

When the value of the "PWM" signal is "1," the motor current passes through the first switch which receives the "PWM" signal.

When the value of the "PWM" signal is "0," the motor current passes through the second switch of branch A.

As this second switch receives a signal held at "0" during the entire duration where the rotor is in the sector corresponding to the line of the table, the motor current cannot pass through the transistor. It passes through the diode in anti-parallel orientation and possibly the second power diode associated with the switch if it is present.

The motor current is established after a transition period, called the demagnetization period, which occurs at the very beginning of the time phase corresponding to the line of the table.

Table 2 is an example of the control law table of a 120° inverter associated with a PWM type control with active synchronous rectification according to the prior art.

TABLE 2 example of a control law table of a 120° inverter associated with a PWM type control with active synchronous rectification.

| S3 | S2 | S1 | SECT | TOP1 | TOP2 | TOP3 | BOT1 | BOT2 | BOT3 |
|---|---|---|---|---|---|---|---|---|---|
| '0' | '0' | '1' | 1 | '0' | PWM | '0' | '1' | $\overline{PWM}$ | '0' |
| '1' | '0' | '1' | 5 | '0' | '0' | PWM | '1' | '0' | $\overline{PWM}$ |
| '1' | '0' | '0' | 4 | '0' | '0' | PWM | '0' | '1' | $\overline{PWM}$ |
| '1' | '1' | '0' | 6 | PWM | '0' | '0' | $\overline{PWM}$ | '1' | '0' |
| '0' | '1' | '0' | 2 | PWM | '0' | '0' | $\overline{PWM}$ | '0' | '1' |
| '0' | '1' | '1' | 3 | '0' | PWM | '0' | '0' | $\overline{PWM}$ | '1' |

The difference between this table and table 1 corresponds to the presence of the $\overline{PWM}$ signal with is the complementary signal to the PWM signal. When one assumes the value "0," the other assumes the value "1," and vice versa.

When the PWM signal is applied to the switch of a branch, the $\overline{PWM}$ signal is applied to the other switch of said branch.

The operation of the inverter controlled by this table is close to the operation of the inverter controlled by table 1.

In particular, for each line of the table, it is possible to again define a motor current which passes through the motor windings associated with the two branches A and B.

Likewise, depending on the value of the "PWM" signal, the motor current does not pass through the same elements of branch A.

When the value of the "PWM" signal is "1," the motor current passes through the first switch which receives the "PWM" signal.

On the other hand, when the value of the "PWM" signal is "0," the second switch of branch A then receives the $\overline{PWM}$ signal, the value of which is "1." The motor current then passes through the transistor.

The value of control of this type is to limit losses by electrical conduction relative to table 1. Losses by conduction are in fact smaller when the current passes through the transistor than when the current passes through the diode in anti-parallel orientation, and possibly the second power diode associated with the switch.

Figure 3:
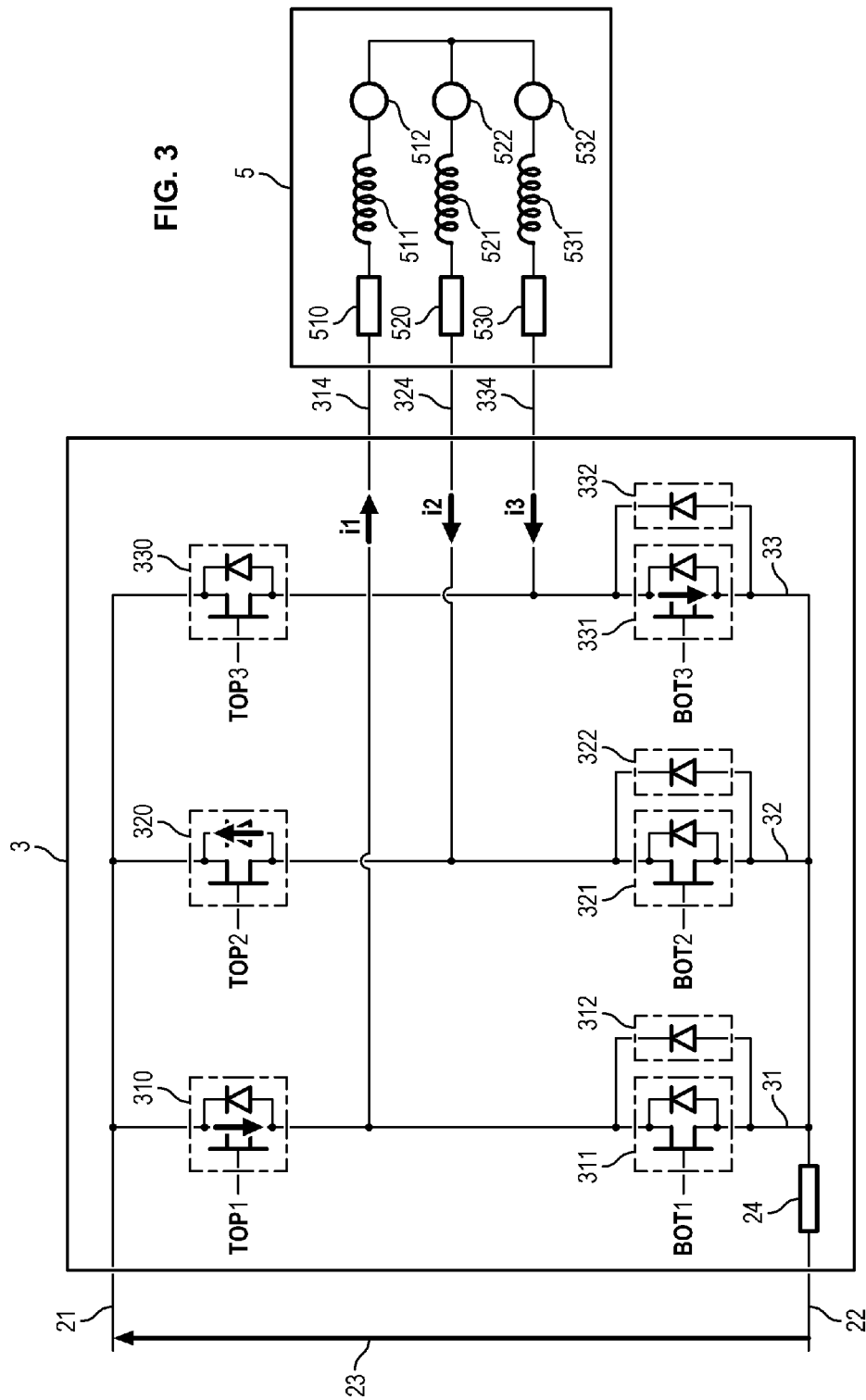
FIGS. 3 and 4 show the electrical circuits of the inverter and of the motor during a so-called demagnetization period, on the one hand, according to the prior art and on the other hand according to an embodiment of the invention.
Figure 4:
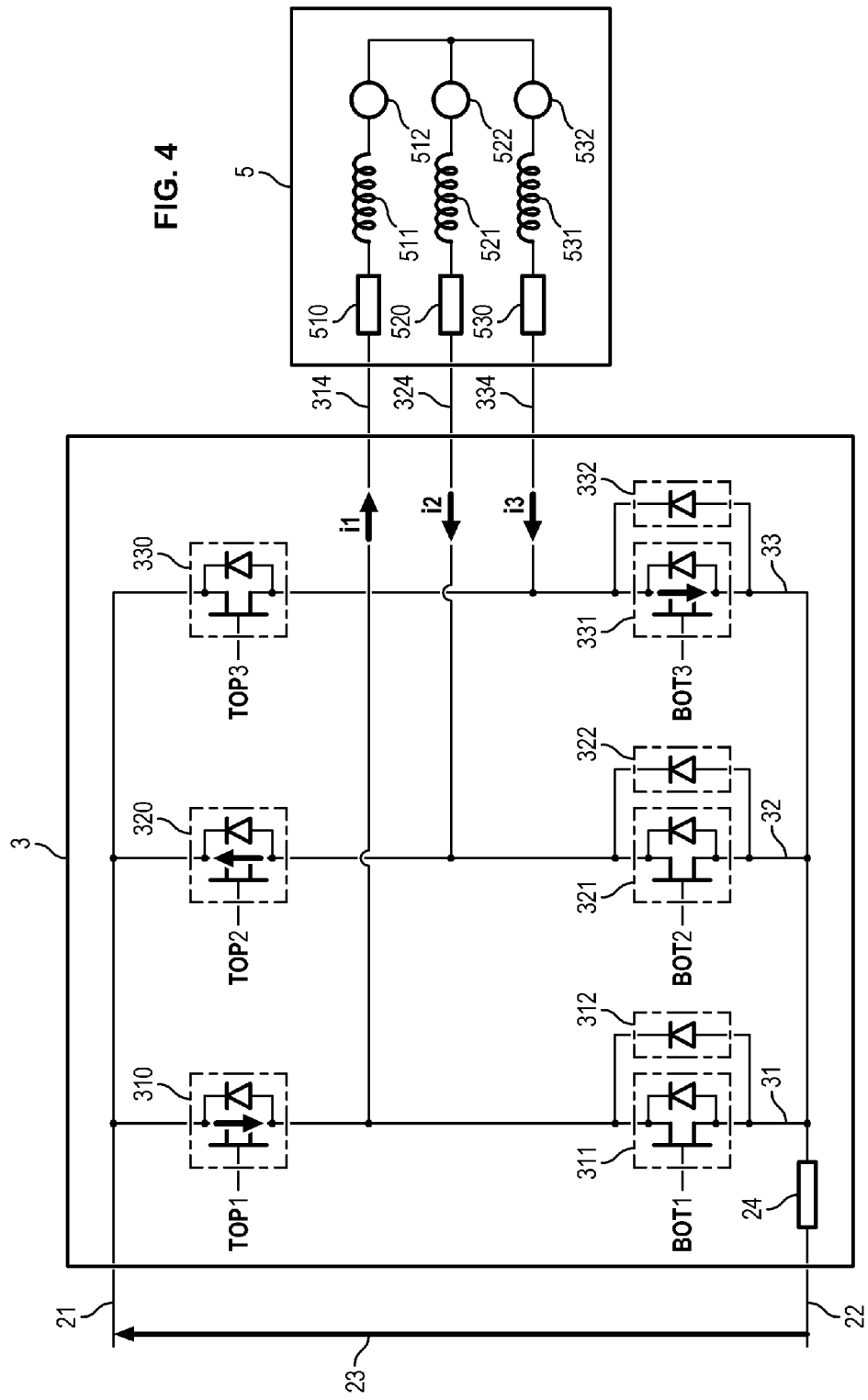

FIGS. 3 and 4 show the electrical circuits of the inverter and of the motor during a so-called demagnetization period, according to the prior art (FIG. 3) on the one hand and according to an embodiment of the invention (FIG. 4), on the other hand.

The electrical circuits shown in FIGS. 3 and 4 are close to the example illustrated by FIG. 2: only a shunt resistor 24 located on the negative line 22 is added relative to this FIG. 2.

FIG. 3 represents the electrical circuits of the inverter and of the motor during a particular period corresponding to one of the lines of table 1.

More precisely, this is the period located immediately after the transition of from line "SECT" 6, corresponding to a phase 6, to the line "SECT" 2, corresponding to a phase 2.

During phase 6, the switch 310 receives the "PWM" signal, the switch 321 receives the signal "1."

In this situation, branch A corresponds to the branch 31, branch B corresponds to the branch 32, and the motor current passes through the coils 511 and 521.

The coils 511 and 521 accumulate magnetic energy during phase 6.

During phase 2, the switch 310 receives the "PWM" signal and the switch 331 receives the signal "1."

In this situation, branch A corresponds to the branch 31 and branch B corresponds to the branch 33.

During all of phase 2, a current denoted i1 in FIG. 3 flows through the coil 511, and alternately through the switch 310 (PWM=1) or through the switch 311 (PWM=0). FIG. 3 corresponds to the case where PWM=1, an arrow through the transistor of the switch 310 indicates passage of the current i1.

During all of phase 2 a current denoted i3 in FIG. 3 [flows] through the coil 531, and through the switch 331. An arrow through the transistor of said switch 331 indicates the passage of the current i3.

The current i3 joins the negative line 22 and passes through the shunt resistor 24. Measurement of the voltage at the terminals of the shunt resistor 24 allows measuring the motor current.

At the very beginning of this phase 2, there exists a transition period, called the demagnetization period, during which the coil 521 discharges magnetic energy accumulated during phase 6.

An electrical current, called a demagnetization current, and denoted current i2 in FIG. 3, continues through the coil 521 for this demagnetization period, i.e. the time for the magnetic energy of the coil to be discharged.

The demagnetization current i2 circulates on the line 324 toward the branch 32. This current i2 cannot pass through the transistors of the switches 320 and 321, in the blocking state, or through the possible power diode 322. The current i2 therefore passes through the diode placed in anti-parallel orientation within the switch 320, as indicated by an arrow in FIG. 3.

During the demagnetization period, the performance of the inverter is reduced by the conduction losses through this diode within the switch 320.

Once the magnetic energy is discharged, the current i2 becomes zero, the currents i1 and i3 become equal to the motor current, and the demagnetization period is completed.

There exists a demagnetization period during each period which is located immediately after the transition from one line to the next line in table 1.

For each, the demagnetization current flows through a diode positioned in anti-parallel to the transistor causing losses by conduction.

FIG. 4 represents the electrical circuits of the inverter and the motor during a particular period corresponding to one of the embodiments of the invention.

The situation is almost identical to the situation described above for FIG. 3. In particular, it is located after the transition from one phase to a following phase and there exists a transition period, called the demagnetization period, during which the coil 521 retains magnetic energy accumulated during the preceding phase.

The demagnetization current denoted i2 in FIG. 4, which continues through the coil 521, circulates this time through the transistor of the switch 320, because this time, during the duration of the demagnetization period, said transistor of the switch 320 is held in the passing state and the transistor of the switch 321 is held in the blocking state.

In this embodiment of the invention, the demagnetization is controlled, in the sense that demagnetization current is made to pass through the transistor instead of the diode placed in anti-parallel orientation, for all the demagnetization periods.

Thanks to controlled demagnetization, the performance of the inverter is improved relative to the situation described in FIG. 3, because conduction losses through the diode are avoided.

This improvement can be provided for a control law table of a 120° inverter associated with a PWM type control with or without active synchronous rectification, according to tables 3 and 4.

Table 3 is a control law table of a 120° inverter associated with a PWM type control without active synchronous rectification, with controlled demagnetization:

TABLE 3 control law table of a 120° inverter associated with a PWM type control without active synchronous rectification with control demagnetization.

| Sequence | SECT | TOP1 | TOP2 | TOP3 | BOT1 | BOT2 | BOT3 |
|---|---|---|---|---|---|---|---|
| Demagnetization 3 → 1 | 1 | '0' | PWM | '1' | '1' | '0' | '0' |
| — | 1 | '0' | PWM | '0' | '1' | '0' | '0' |
| Demagnetization 1 → 5 | 5 | '0' | '0' | PWM | '1' | '1' | '0' |
| — | 5 | '0' | '0' | PWM | '1' | '0' | '0' |
| Demagnetization 5 → 4 | 4 | '1' | '0' | PWM | '0' | '1' | '0' |
| — | 4 | '0' | '0' | PWM | '0' | '1' | '0' |
| Demagnetization 4 → 6 | 6 | PWM | '0' | '0' | '0' | '1' | '1' |
| — | 6 | PWM | '0' | '0' | '0' | '1' | '0' |
| Demagnetization 6 → 2 | 2 | PWM | '1' | '0' | '0' | '0' | '1' |
| — | 2 | PWM | '0' | '0' | '0' | '0' | '1' |
| Demagnetization 2 → 3 | 3 | '0' | PWM | '0' | '1' | '0' | '1' |
| — | 3 | '0' | PWM | '0' | '0' | '0' | '1' |

Table 3 is constructed based on table 1.

Between each of the lines of table 1, a line called "demagnetization X→Y" has been added as the first column and associated with the transition from the preceding sector X to the sector Y.

For each demagnetization line, the commands sent to the transistors are the same as for the following phase Y in the table, except for one transistor for which the command is modified from "0" to "1."

Said transistor thus placed in a passing state has the demagnetization current pass through it of the coil which had the motor current passing through it during the preceding phase X and which no longer has the motor current passing through it during phase Y.

The duration of the demagnetization period corresponds to the time required for the magnetic energy accumulated by said coil to be discharged.

Table 4 is a control law table of a 120° inverter associated with a PWM type control with active synchronous rectification, where the same lines for the demagnetization period as in table 3 are introduced.

TABLE 4 control law table of a 120° inverter associated with a PWM type control with active synchronous rectification and controlled demagnetization.

| Sequence | SECT | TOP1 | TOP2 | TOP3 | BOT1 | BOT2 | BOT3 |
|---|---|---|---|---|---|---|---|
| Demagnetization 3 → 1 | 1 | '0' | PWM | '1' | '1' | $\overline{PWM}$ | '0' |
| — | 1 | '0' | PWM | '0' | '1' | $\overline{PWM}$ | '0' |
| Demagnetization 1 → 5 | 5 | '0' | '0' | PWM | '1' | '1' | $\overline{PWM}$ |
| — | 5 | '0' | '0' | PWM | '1' | '0' | $\overline{PWM}$ |
| Demagnetization 5 → 4 | 4 | '1' | '0' | PWM | '0' | '1' | $\overline{PWM}$ |
| — | 4 | '0' | '0' | PWM | '0' | '1' | $\overline{PWM}$ |
| Demagnetization 4 → 6 | 6 | PWM | '0' | '0' | $\overline{PWM}$ | '1' | '1' |
| — | 6 | PWM | '0' | '0' | $\overline{PWM}$ | '1' | '0' |
| Demagnetization 6 → 2 | 2 | PWM | '1' | '0' | $\overline{PWM}$ | '0' | '1' |
| — | 2 | PWM | '0' | '0' | $\overline{PWM}$ | '0' | '1' |
| Demagnetization 2 → 3 | 3 | '0' | PWM | '0' | '1' | $\overline{PWM}$ | '1' |
| — | 3 | '0' | PWM | '0' | '0' | $\overline{PWM}$ | '1' |

The previously provided modification in table 3 relative to table 1, is provided this time to table 2.

The duration of a demagnetization period can be different from one line to another of the table, because the electrical equations are different depending on whether the magnetization current flows toward the positive line 21, corresponding to the transistors 310, 320 and 330 or toward the negative line 22, corresponding to the transistors 311, 321 and 331.

In addition, the solution of the equations mentioned above requires considerable material and software resources.

Tables 5 and 6 are control law tables of a 120° inverter associated with a PWM type control without and with active synchronous rectification and control lines for the demagnetization periods modified respectively relative to table 3 and relative to table 4.

The modification concerns retention in a non-modulated state of the transistor normally PWM controlled.

TABLE 5 control law table of a 120° inverter associated with a PWM type control, without active synchronous rectification and with controlled demagnetization and PWM retention.

| Sequence | SECT | TOP1 | TOP2 | TOP3 | BOT1 | BOT2 | BOT3 |
|---|---|---|---|---|---|---|---|
| Demagnetization 3 → 1 | 1 | '0' | '1' | '1' | '1' | '0' | '0' |
| 1 | 1 | '0' | PWM | '0' | '1' | '0' | '0' |
| Demagnetization 1 → 5 | 5 | '0' | '0' | '1' | '1' | '1' | '0' |
| 5 | 5 | '0' | '0' | PWM | '1' | '0' | '0' |
| Demagnetization 5 → 4 | 4 | '1' | '0' | '1' | '0' | '1' | '0' |
| 4 | 4 | '0' | '0' | PWM | '0' | '1' | '0' |
| Demagnetization 4 → 6 | 6 | '1' | '0' | '0' | '0' | '1' | '1' |
| 6 | 6 | PWM | '0' | '0' | '0' | '1' | '0' |
| Demagnetization 6 → 2 | 2 | '1' | '1' | '0' | '0' | '0' | '1' |
| 2 | 2 | PWM | '0' | '0' | '0' | '0' | '1' |
| Demagnetization 2 → 3 | 3 | '0' | '1' | '0' | '1' | '0' | '1' |
| 3 | 3 | '0' | PWM | '0' | '0' | '0' | '1' |

TABLE 6 control law of a 120° inverter associated with a PWM type control, with active synchronous rectification, controlled demagnetization and PWM retention.

| Sequence | SECT | TOP1 | TOP2 | TOP3 | BOT1 | BOT2 | BOT3 |
|---|---|---|---|---|---|---|---|
| Demagnetization 3 → 1 | 1 | '0' | '1' | '1' | '1' | '0' | '0' |
| 1 | 1 | '0' | PWM | '0' | '1' | $\overline{PWM}$ | '0' |
| Demagnetization 1 → 5 | 5 | '0' | '0' | '1' | '1' | '1' | '0' |
| 5 | 5 | '0' | '0' | PWM | '1' | '0' | $\overline{PWM}$ |
| Demagnetization 5 → 4 | 4 | '1' | '0' | '1' | '0' | '1' | '0' |
| 4 | 4 | '0' | '0' | PWM | '0' | '1' | $\overline{PWM}$ |
| Demagnetization 4 → 6 | 6 | '1' | '0' | '0' | '0' | '1' | '1' |
| 6 | 6 | PWM | '0' | '0' | $\overline{PWM}$ | '1' | '0' |
| Demagnetization 6 → 2 | 2 | '1' | '1' | '0' | '0' | '0' | '1' |
| 2 | 2 | PWM | '0' | '0' | $\overline{PWM}$ | '0' | '1' |
| Demagnetization 2 → 3 | 3 | '0' | '1' | '0' | '1' | '0' | '1' |
| 3 | 3 | '0' | PWM | '0' | '0' | $\overline{PWM}$ | '1' |

In these embodiments of the invention, the state of the transistor normally PWM controlled is imposed at "1" during the demagnetization period.

This allows limiting the number of equations to be considered and reducing the technical difficulty for evaluating the duration of the demagnetization period.

The electrical equations are solved numerically for different values of the speed of rotation of the rotor relative to the stator.

It is possible to improve the accuracy of the solution of the equation by taking into account:
- measurement of the temperature of the air stream which allows refining the motor current calculation,
- accurate measurement of the direct voltage 23,
- measurement of the temperature of the stator of the motor, which allow refining the value of the resistance.
- measurement of the motor current at the time of the change of sector (via the measurement by the shunt resistor 24 for example).

This solution is predetermined prior to setting the inverter into operation, and allows obtaining different pairs of rotor speed and duration of the demagnetization period.

The duration of the demagnetization period is approximated by an affine function of the rotor speed, and it is possible to create a correspondence table between the speed of the rotor and the duration of the demagnetization period, and to store it in memory in the controller.

As for the effect of the speed of the rotor, it is possible to also take into account the effect of the direct voltage 23 which supplies the inverter over the duration of the demagnetization period.

A correspondence table with two inputs (determined value of the rotor speed and value of the direct voltage 23), one output (duration of the demagnetization period), can be generated and placed in the memory of the controller.

Another possible solution would be to generate an equivalent electrical model of the motor and to simulate it directly on the controller as a function of the measurements received.

For this purpose, electrical equations of the motor can be used to simulate its behavior.

In the example of table 4 with active synchronous rectification and active "controlled demagnetization," the electrical equations are then the following:

In the case of the sector change "6 to 2," or "3 to 1" or "5 to 4":

$$\text{if } PWM = \text{'1'}: \quad (EQ\ 1.1)$$
$$Rph \times i(t) + Lph \times \frac{di(t)}{dt} \approx \frac{1}{3} \times (3 \times E(t) - Udc)$$

$$\text{if } PWM = \text{'0'}: \quad (EQ\ 1.2)$$
$$Rph \times i(t) + Lph \times \frac{di(t)}{dt} \approx \frac{1}{3} \times (3 \times E(t) - Udc)$$

In the case of the sector change "1 to 5," or "4 to 6" or "2 to 3":

$$\text{if } PWM = \text{'1'}: \quad (EQ\ 2.1)$$
$$Rph \times i(t) + Lph \times \frac{di(t)}{dt} \approx \frac{1}{3} \times (3 \times E(t) - Udc)$$

$$\text{if } PWM = \text{'0'}: \quad (EQ\ 2.2)$$
$$Rph \times i(t) + Lph \times \frac{di(t)}{dt} \approx \frac{1}{3} \times (3 \times E(t))$$

With
- Rph is the neutral phase resistance of the motor, i.e. the common value of the resistors 510, 520, 530 of the windings.
- Lph is the neutral phase inductance of the motor, i.e. the common value of the inductors 511, 521, 531 of the windings.
- E is the electromotive force between phase and neutral of the motor (proportional to the speed of the motor)
- Udc is the direct voltage 23
- i(t) is the demagnetization current The other elements (characteristics of the transistors, of the diodes) are neglected.

The losses avoided are the more significant the greater the power of the machine. In fact, the power diodes, of the Schottky type for example, cannot endure high current intensities without their performance being degraded.

By way of an example, tests have been carried out on an inverter which supplies a motor according to a 120° control law.

The results are presented in the following table 7:

TABLE 7 comparison of the total conduction losses
in 4 different types of motor control.

| Motor control type | Total losses | Improvement in losses |
|---|---|---|
| 120° control table (reference) | 1.84 W | reference |
| 120° control table with controlled demagnetization | 1.65 W | −10.00% |
| 120° control table with synchronous rectification | 0.92 W | −50.00% |
| 120° control table with active synchronous rectification and controlled demagnetization | 0.72 W | −60.00% |

The first line corresponds to an inverter which supplies a motor according to a 120° control law without active synchronous rectification or controlled demagnetization.

The corresponding losses constitute the reference for estimating the improvement in losses of the other types of control presented in the following lines.

In the second line, the addition of controlled demagnetization to the reference 120° control law allows a 10% reduction, in this example, in total conduction losses.

In this exemplary implementation of controlled demagnetization, the duration of the demagnetization period is approximated by an affine function of the speed of the rotor and a correspondence table between the speed of the rotor and the duration of the demagnetization period is stored in memory in the controller.

In the third line, the addition of synchronous rectification to the reference 120° control law allows reducing the total conduction losses by 50% in this example.

Finally, in the fourth line, the addition of controlled demagnetization and of synchronous rectification to the reference 120° control law allows reducing the total conduction losses by 60% in this example.

Controlled demagnetization has been presented in this section as an addition to two examples of control law tables of a 120° inverter associated with a PWM type control with or without active synchronous rectification.

Controlled demagnetization can be implemented in other examples of control law tables of a 120° inverter, such as for example the table of the 120° square-wave alternatively leading PWM type inverter (table 8), or the table of the 120° square-wave symmetrical PWM type inverter (table 9).

TABLE 8 example of a control law table of a 120°
square-wave alternatively leading PWM inverter.

| Motor position | TOP1 | TOP2 | TOP3 | BOT1 | BOT2 | BOT3 |
|---|---|---|---|---|---|---|
| 1 | '0' | '1' | '0' | PWM | '0' | '0' |
| 2 | '0' | '0' | PWM | '1' | '0' | '0' |
| 3 | '0' | '0' | '1' | '0' | PWM | '0' |
| 4 | PWM | '0' | '0' | '0' | '1' | '0' |
| 5 | '1' | '0' | '0' | '0' | '0' | PWM |
| 6 | '0' | PWM | '0' | '0' | '0' | '1' |

TABLE 9 example of a control law table of a 120°
square-wave symmetrical PWM inverter.

| Motor position | TOP1 | TOP2 | TOP3 | BOT1 | BOT2 | BOT3 |
|---|---|---|---|---|---|---|
| 1 | '0' | '1' | '0' | PWM | '0' | '0' |
| 2 | '0' | PWM | '0' | '1' | '0' | '0' |
| 3 | '0' | '0' | PWM | '1' | '0' | '0' |
| 4 | '0' | '0' | '1' | PWM | '0' | '0' |
| 5 | '0' | '0' | '1' | '0' | PWM | '0' |
| 6 | '0' | '0' | PWM | '0' | '1' | '0' |
| 7 | PWM | '0' | '0' | '0' | '1' | '0' |
| 8 | '1' | '0' | '0' | '0' | PWM | '0' |
| 9 | '1' | '0' | '0' | '0' | '0' | PWM |
| 10 | PWM | '0' | '0' | '0' | '0' | '1' |
| 11 | '0' | PWM | '0' | '0' | '0' | '1' |
| 12 | '0' | '1' | '0' | '0' | '0' | PWM |

As for the preceding examples, TOP1, BOT1, TOP2, BOT2, TOP3 and BOT3 are cyclic digital signals of six switches that are associated in pairs. The associated switches are those which are controlled, on the one hand, by the TOP1 and BOT1 signal, and on the other hand by the TOP2 and BOT2 signal, and finally by the TOP3 and BOT3 signals.

To implement controlled demagnetization in the examples of tables 8 and 9 of control laws of a 120° inverter, it is possible to add, between two successive lines X and Y, a "demagnetization X→Y" control line.

For each demagnetization line, the commands sent to the transistors are the same as for line Y, except for one transistor for which the command is modified from "0" to "1." This is the transistor associated with the transistor which is commanded to "1" or to "PWM" in line X and to "0" in line Y.

The invention claimed is:

1. A method for controlling a three-phase inverter using a 120° control arrangement associated with a PWM type control, the three-phase inverter being controlled by a controller and configured to power a motor of a device carried on board an aircraft, the motor being a permanent magnet synchronous motor and comprising a stator, a rotor and three motor windings according to a 120° control arrangement, the rotor being designed to be driven in rotation relative to the stator when the motor is powered, the three-phase inverter comprising three branches, each branch including a first switch and a second switch, each branch being associated with a motor winding, each first switch and each second switch comprising a transistor and a diode placed in antiparallel orientation, the method comprising:

when the first switch of a first branch of the three branches is controlled during a first time period by a PWM signal or by a signal designed to control the first switch of the first branch in a passing state, an angle between the stator and the rotor entering in a first angular sector of the 120° control arrangement when the first time period begins, the angle between the stator and the rotor exiting the first angular sector when the first time period ends, the first switch being controlled during a second time period by a signal designed to control the first switch of the first branch in a blocking state so that the first switch remains continuously in the blocking state from a beginning of the second time period until an end of the second time period, the angle between the stator and the rotor entering in a second angular sector of the 120° control arrangement when the second time period begins, the angle between the stator and the rotor exiting the second angular sector when the second time period ends, the first angular sector and the second angular sector having each an angle measure equal to 60°, the second angular sector following the first angular sector in the 120° control arrangement, controlling when the angle between the stator and the rotor leaves the first angular sector and enters the second angular sector the second switch of the first branch in the passing state for a discharge time interval, so that an electric current flows through the motor winding associated with the first branch and through the transistor of the second switch, the discharge time interval being sufficiently long for the motor winding associated with the first branch to magnetically discharge.

2. The method according to claim 1, comprising replacing, during the discharge time interval, a PWM signal controlling a first switch of a second branch of the three branches by a signal designed to control the first switch of the second branch in a passing state.

3. The method according to claim 1, wherein the 120° control arrangement associated with a PWM type control is configured with active synchronous rectification, the method comprising:
when the first switch is controlled during the first time period by the PWM signal, the second switch is controlled during the first time period by a $\overline{\text{PWM}}$ signal.

4. The method according to claim 3, comprising replacing, during the discharge time interval, a PWM signal controlling a first switch of a second branch of the three branches by a signal designed to control the first switch of the second branch in a passing state.

5. The method according to claim 4, comprising replacing, during the discharge time interval, a $\overline{\text{PWM}}$ signal controlling the second switch of the second branch of the three branches by a signal designed to control the second switch of the second branch in a blocking state.

6. The method according to claim 1, comprising:
determining a value of a speed of the rotor relative to the stator; and
calculating a value of the discharge time interval using an affine relation of the determined value of the speed of the rotor relative to the stator, said affine relation being previously determined and stored in a memory in the controller.

7. The method according to claim 6, wherein the affine relation is predetermined by the implementation of the following steps:
estimating electrical impedances of the motor for different determined values of the speed of the rotor relative to the stator;
numerically solving electrical equations governing the motor for different determined values of the speed of the rotor relative to the stator;
estimating values of the discharge time interval for different determined values of the speed of the rotor relative to the stator;
determining an affine relation of the estimated duration of the discharge time interval as a function of the determined value of the speed of the rotor relative to the stator; and
storing in the memory in the controller the parameters of the affine relation.

8. A controller of a three-phase inverter using a 120° control arrangement associated with a PWM type control, configured to power a motor of a device carried on board an aircraft, the motor permanent magnet synchronous motor and comprising a stator, a rotor and three motor windings according to a 120° control arrangement, the rotor being designed to be driven in rotation relative to the stator when the motor is powered, the three-phase inverter comprising three branches, each branch including a first switch and a second switch associated with a motor winding, each first switch and each second switch comprising a transistor and a diode placed in anti-parallel orientation, the controller being configured to:
generate a first digital signal having two voltage levels configured to control a first switch of a first branch of the three branches either in a passing state or alternately switched from a blocking state to a passing state according to a PWM signal during a first time period, an angle between the stator and the rotor entering in a first angular sector of the 120° control arrangement when the first time period begins, the angle between the stator and the rotor exiting the first angular sector when the first time period ends, the first digital signal being further configured to control the first switch during a second time period in a blocking state so that the first switch remains continuously in the blocking state from a beginning of the second time period until an end of the second time period, the angle between the stator and the rotor entering in a second angular sector of the 120° control arrangement when the second time period begins, the angle between the stator and the rotor exiting the second angular sector when the second time period ends, the first angular sector and the second angular sector having each an angle measure equal to 60°, the second angular sector following the first angular sector in the 120° control arrangement, and generate a second digital signal having a voltage level capable of controlling when the angle between the stator and the rotor leaves the first angular sector and enters the second angular sector the second switch of the first branch in a passing state for a discharge time interval, so that an electric current flows through the motor winding associated with the first branch and through the transistor of the second switch, the discharge time interval being sufficiently long for the motor winding associated with the first branch to magnetically discharge.

9. The controller according to claim 8, further configured to replace, during the discharge time interval, a digital PWM signal controlling a first switch of a second branch of the three branches by a signal designed to control the first switch of the second branch in a passing state.

10. The controller according to claim 8, wherein the 120° control arrangement associated with the PWM type control is configured with active synchronous rectification the controller being configured so as to:
when the controller generates the first digital signal configured to control the first switch alternately switched from a blocking state to a passing state according to the PWM signal during the first time period, the second switch is controlled during the first time period by a $\overline{\text{PWM}}$ signal.

11. The controller according to claim 10, further configured to replace, during the discharge time interval, a digital PWM signal controlling a first switch of a second branch of the three branches by a signal designed to control the first switch of the second branch in a passing state.

12. The controller according to claim 11, further configured to replace, during the discharge time interval, a digital $\overline{\text{PWM}}$ signal controlling the second switch of the second branch of the three branches by a signal designed to control the second switch of the second branch in a blocking state.

13. The controller according to claim 8, further comprising an input of a communication line to a sensor designed to measure a position or a speed of the rotor relative to the stator of the motor, a medium designed to retain in memory a determined value of a speed and a predetermined affine relation of the magnetic discharge time interval of a motor winding associated with a branch as a function of the determined value of the speed of the motor;

and means for calculating, as a function of the determined value of the speed of the motor, a duration of a magnetic discharge time interval of a motor winding associated with a branch.

14. An electrical power supply system of a motor, the motor comprising a stator and a rotor mounted in rotation relative to the stator, the power supply system comprising:
a three-phase inverter comprising a plurality of switches controlled for regulation of an electrical power supply of the motor,
a controller of the three-phase inverter, and
a sensor configured to measure a position or a speed of the rotor relative to the stator,
the controller being the controller according to claim 8.

* * * * *